US008376844B2

(12) United States Patent
Judd et al.

(10) Patent No.: US 8,376,844 B2
(45) Date of Patent: Feb. 19, 2013

(54) GAME ENHANCER

(75) Inventors: Alan J. Judd, Eindhoven (NL); Richard Cole, Eindhoven (NL); David Eves, Eindhoven (GB)

(73) Assignee: AMBX UK Limited, Redhill, Surrey (GB)

( * ) Notice: Subject to any disclaimer, the term of this patent is extended or adjusted under 35 U.S.C. 154(b) by 917 days.

(21) Appl. No.: 12/305,105

(22) PCT Filed: Jun. 14, 2007

(86) PCT No.: PCT/IB2007/052264
§ 371 (c)(1),
(2), (4) Date: Dec. 16, 2008

(87) PCT Pub. No.: WO2007/148266
PCT Pub. Date: Dec. 27, 2007

(65) Prior Publication Data
US 2009/0280896 A1    Nov. 12, 2009

(30) Foreign Application Priority Data
Jun. 19, 2006   (EP) ..................................... 06115685

(51) Int. Cl.
*A63F 13/02* (2006.01)
(52) U.S. Cl. ............... 463/30; 709/201; 463/31; 463/35
(58) Field of Classification Search .................. 463/7–9, 463/30, 42
See application file for complete search history.

(56) References Cited

U.S. PATENT DOCUMENTS

| 4,672,541 | A | * | 6/1987 | Bromley et al. | 463/3 |
| RE33,559 | E | * | 3/1991 | Fallacaro et al. | 386/201 |
| 5,486,141 | A | * | 1/1996 | Ohga et al. | 472/60 |
| 5,499,920 | A | * | 3/1996 | Trumbull | 434/69 |
| 6,050,822 | A | * | 4/2000 | Faughn | 434/11 |
| 6,056,640 | A | * | 5/2000 | Schaaij | 463/4 |
| 6,285,351 | B1 | * | 9/2001 | Chang et al. | 345/156 |
| 6,572,475 | B1 | * | 6/2003 | Okabe et al. | 463/30 |
| 6,659,773 | B2 | * | 12/2003 | Roy et al. | 434/55 |
| 7,275,987 | B2 | * | 10/2007 | Shimakawa et al. | 463/9 |
| 7,364,508 | B2 | * | 4/2008 | Loose et al. | 463/30 |
| 7,739,479 | B2 | * | 6/2010 | Bordes et al. | 712/1 |
| 7,775,883 | B2 | * | 8/2010 | Smoot et al. | 463/36 |
| 7,867,085 | B2 | * | 1/2011 | Pryzby et al. | 463/30 |
| 7,930,628 | B2 | * | 4/2011 | Eves et al. | 715/234 |
| 2001/0036868 | A1 | * | 11/2001 | Roy et al. | 472/130 |
| 2002/0169012 | A1 | * | 11/2002 | Eves et al. | 463/1 |
| 2002/0169817 | A1 | * | 11/2002 | Eves et al. | 709/201 |

(Continued)

FOREIGN PATENT DOCUMENTS
WO WO 2004082275 9/2004
WO WO 2005058442 6/2005

*Primary Examiner* — Matthew W Such
*Assistant Examiner* — William Harriston
(74) *Attorney, Agent, or Firm* — Burns & Levinson LLP; Bruce D. Jobse, Esq.

(57) ABSTRACT

A method, apparatus, computer program, and computer readable storage medium storing the computer program, is disclosed for generating a real-world description to operate a set of devices (12, 14, 16) to augment a user's experience of a game world. The game world is defined by a game world model, and parameters of the game world model are accessed by a first module being run within a protected computing environment. These parameters are sent to a second module running outside of the protected computing environment, and the second module uses these parameters to generate the real world description for controlling the set of devices.

13 Claims, 4 Drawing Sheets

U.S. PATENT DOCUMENTS

| Publication | Date | Inventor | Class |
|---|---|---|---|
| 2005/0086040 A1* | 4/2005 | Davis et al. | 703/22 |
| 2005/0124412 A1* | 6/2005 | Son et al. | 463/30 |
| 2005/0203906 A1* | 9/2005 | Eves et al. | 707/10 |
| 2005/0249367 A1* | 11/2005 | Bailey | 381/310 |
| 2005/0264044 A1* | 12/2005 | Lee | 297/85 |
| 2006/0009285 A1* | 1/2006 | Pryzby et al. | 463/30 |
| 2006/0030405 A1* | 2/2006 | Robertson | 463/30 |
| 2006/0165247 A1* | 7/2006 | Mansfield et al. | 381/307 |
| 2006/0170376 A1* | 8/2006 | Piepgras et al. | 315/295 |
| 2006/0183542 A1* | 8/2006 | Ng et al. | 463/31 |
| 2006/0211494 A1* | 9/2006 | Helfer | 463/30 |
| 2006/0247918 A1* | 11/2006 | Schmidt et al. | 704/200 |
| 2006/0258446 A1* | 11/2006 | Nguyen et al. | 463/30 |
| 2007/0021199 A1* | 1/2007 | Ahdoot | 463/30 |
| 2007/0270216 A1* | 11/2007 | Pryzby | 463/35 |
| 2008/0055248 A1* | 3/2008 | Tremblay et al. | 345/158 |
| 2008/0153591 A1* | 6/2008 | Deligiannidis | 463/31 |
| 2008/0265797 A1* | 10/2008 | Van Doorn | 315/292 |
| 2008/0276157 A1* | 11/2008 | Kustka et al. | 715/201 |
| 2008/0305713 A1* | 12/2008 | Cortenraad | 446/485 |
| 2009/0209308 A1* | 8/2009 | Ciarrocchi | 463/1 |
| 2009/0237492 A1* | 9/2009 | Kikinis et al. | 348/47 |
| 2009/0237564 A1* | 9/2009 | Kikinis et al. | 348/584 |
| 2009/0238378 A1* | 9/2009 | Kikinis et al. | 381/92 |
| 2010/0062860 A1* | 3/2010 | Eves et al. | 463/42 |
| 2011/0111846 A1* | 5/2011 | Ciarrocchi | 463/30 |
| 2011/0116201 A1* | 5/2011 | Rothkopf | 361/170 |

* cited by examiner

GAME ENHANCER

This application is a national phase application of and claims priority to PCT/IB2007/052264, filed Jun. 14, 2007, which claims priority to European Application No. 06115685.7, filed Jun. 19, 2006, the disclosures of which are incorporated herein in their entirety, for all purposes.

This invention relates to accessing parameters from computer game world models, and operating a set of devices according to the parameters to augment the game experience.

When playing a computer game, the user's experience of the game consists, in most cases, of the viewing of a simple display device while listening to the associated audio. Since the advent of computer games, it has been desired to augment this user experience. A number of ways of achieving this have been proposed, including head mounted displays, surround screen installations and game peripherals such as rumble pads. The object of these functional improvements has been to increase the user's immersion in the game environment, or game world model.

Applicant's International Patent Application Publication WO 02/092183 describes a real world representation system and language in which a set of devices are operated according to a received real world description, and hence render a "real world" experience in the ambient environment of the user. For example, the real world experience may be rendered by lighting devices that project coloured light onto the walls of the user's private dwelling, by fan devices that simulate wind within the dwelling, or by "rumble" devices that are embedded into the user's furniture to cause the user to feel vibrations. Hence an ambient immersive environment is created, which is flexible, scalable and provides an enhanced experience to a user.

Applicant's International Patent Application Publication WO 02092122 discloses a method of operating a set of devices according to a game world model. The method comprises receiving a signal comprising at least part of a game world model, analysing the signal to generate a real-world description in the form of an instruction set of a markup language, and operating the devices according to the description to give real world effects in the ambient environment. The real-world description is in the form of an instruction set of a markup language that communicates a description of physical environments and the objects within them, their relationship to the user, each other, and to the physical space of the user's ambient environment. The instruction set of the markup language is interpreted, and then one or more devices in the user's ambient environment are used to render the real world effects. These real world effects augment and enhance the user's experience of the computer game world. For example, the user's character in the virtual computer game world may be standing in a forest on a summers evening, and so the real-world description might read <FOREST>, <SUMMER>, <EVENING>. This description may be interpreted into specific instructions for controlling devices in the user's real world ambient environment, such as to give a colour tone of a pleasant green and a light level of low but warm. Hence, an environment in the virtual game world may be rendered in the user's real world ambient environment to provide an enhanced game playing experience.

To effectively augment the user's experience of the game, the devices rendering the real world effects (real world experience) must be in close synchronicity with the events in the game world. For example, if a lightening flash occurs in the game world, the flash should immediately be reflected by the rendering devices (e.g. by pulsing a light-producing device). Hence changes in the game world must be reflected by immediate changes in the real world description being generated to operate the devices.

In order to generate the real-world description, it is desirable to access parameters of the game world model so that the state of the game world's virtual environment can be determined. However, it is common for computer game applications (programs) to deliberately prevent other applications (programs) from having full access to the computer game application. Computer game applications commonly do this by defining a protected computing environment, within which all applications wishing to gain access to the computer game application must be executed (run).

Since the protected computing environment is defined by the computer game application, the computer game application is able to restrict the functionality of the applications that are executed within the protected computing environment, and hence restrict the functionality of the applications that are allowed to access the computer game application.

In the context of computer game applications, the protected computing environment is usually implemented for security reasons, to prevent third parties from creating applications that could modify the computer game's functionality in undesired ways and/or to undesired extents.

Hence, for many computer game applications, the accessibility to game world model parameters to enable the rendering of real world experiences is greatly reduced, or impossible.

Additionally, applications being executed in the protected computing environment are often only allowed access to hardware devices that are specifically allowed by the computer game application. Hence, applications being executed in the protected computing environment are unlikely to have access to hardware devices that can be used to render the real world experience.

Furthermore, applications being executed in the protected computing environment typically do not have access to the level of computing power required to generate real world descriptions to operate devices in close synchronicity with changes in the game world.

It is therefore an object of the invention to improve upon the known art.

According to a first aspect of the invention, there is provided a method for generating a real world description to operate a set of devices to augment a user's experience of a computer game world, the method comprising:

executing a game world engine to generate a computer game world model, the game world engine being associated with a protected computing environment;

accessing parameters of the game world model, using a first module being executed within the protected computing environment;

sending the parameters, via a communication channel, to a second module being executed outside of the protected computing environment; and generating, in the second module and according to the parameters, the real world description.

Accordingly, it is possible to generate a real-world description to operate a set of devices in close synchronicity with a game world, thereby enhancing the user's experience of the game world, despite the restrictions imposed by the protected computing environment.

Advantageously, the second module running outside of the protected computing environment is not subject to the same restrictions to which the first module is subject. In particular, the second module has access to greater computing power, and may therefore generate real world descriptions in close synchronicity with changes in the virtual game world.

Furthermore, the second module has access to the set of (one or more) devices for rendering the real world experience. Therefore, the first and second modules together enable the creation of complex real world effects that can greatly improve a user's experience of a game world.

Applications that are run within a computer game's protected computing environment are often referred to as "plug-in" applications. These plug-in applications are often allowed access to a communication channel for sending data to other games via the internet, for example for the purposes of multiplayer game playing, as will be apparent to those skilled in the art.

Advantageously, such a communication channel could be utilised by the first module, not for the conventional purpose of communicating via the Internet with another computer game, but for the purpose of sending game world model parameters to the second module for generating a real world description of the game world.

Conveniently, the communication channel may use a protocol that is typically used for implementing multiplayer games over the internet, such as TCP/IP.

According to a second aspect of the invention, there is provided an apparatus configured to generate a real world description to operate a set of devices to augment a user's experience of a computer game world, the apparatus comprising:
a memory adapted to store:
  a game world engine;
  a first module;
  a second module;
a communication channel for enabling inter-module communication between the first and second modules; and
a processor adapted to:
  execute the game world engine to generate a computer game world model, the game world engine being associated with a protected computing environment;
  execute the first module within the protected computing environment, to access parameters of the game world model;
  send the parameters, via the communication channel, to the second module;
  execute the second module outside of the protected computing environment, to generate the real world description according to the parameters.

Accordingly, there is provided an apparatus for generating a real-world description to operate a set of devices in close synchronicity with a game world, thereby enhancing the user's experience of the game world. The communication channel is suitable for carrying data between the first and second modules, for example data comprising computer game world model parameters.

According to a third aspect of the invention, there is provided a computer program, comprising program instructions for causing a processor to carry out the method of the first aspect of the invention.

According to a fourth aspect of the invention, there is provided a computer readable storage medium, storing the computer program of the third aspect of the invention.

Embodiments of the invention will now be described, by way of example only, and with reference to the accompanying drawings, in which:—

An embodiment of the invention is now described with reference to FIGS. 1, 2, and 3.

Figure 1:
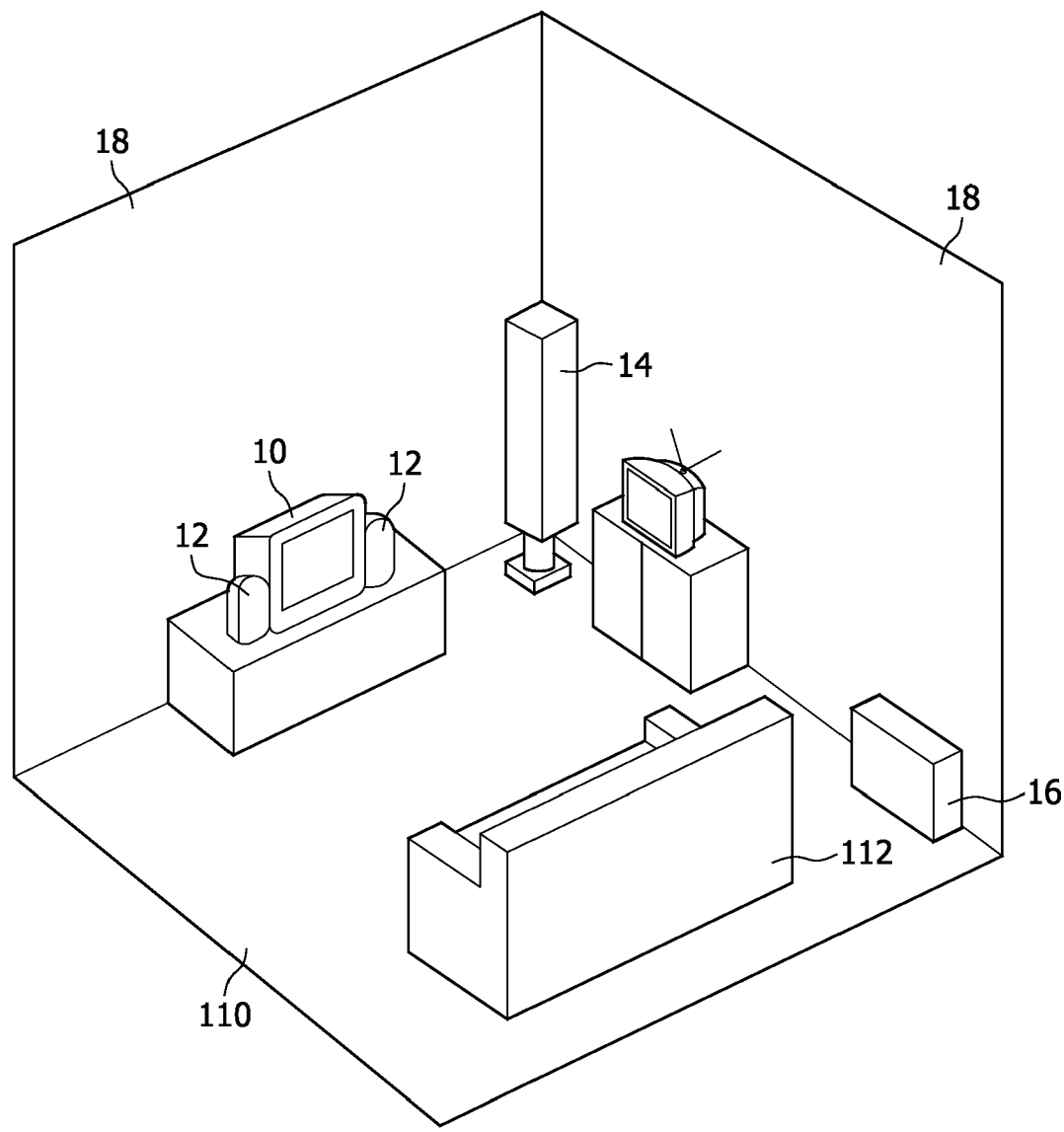
FIG. 1 shows a system for augmenting a user's experience of a game world according to an embodiment of the invention.

FIG. 1 shows a system comprising a set of devices including a computer with display device 10, audio speakers 12, a lighting device 14, a heating device 16, walls 18, floor 110. These devices together contribute to make up the ambient environment, each device being arranged to provide one or more real-world effects. For example, the lighting device 14 contributes to the colour tones as well as to the luminance level. The devices may be electronic, or purely mechanical, or a mixture of both, such as a fan creating a real world effect in the form of a draught of air. The devices are interconnected by either a wireless network or a wired network such as a powerline carrier network. Of course, the environment may include normal furniture 112. The computer may be a so-called "media-PC" enabling computing, gaming and audio/video home theatre applications.

At least one of the devices making up the system is arranged to receive a real-world description in the form of an instruction set of a markup language, the devices being operated according to said description. In this example, this description augments a "first person shooter" computer game that a user is playing on computer 10. As different environments are encountered by the user's character in the game, a description generated by computer 10 is transmitted to the devices in the system. The devices then render this description onto the real world environment of FIG. 1.

For a full description of the aspects of operation of such a real world system and real world description language, the reader is directed to published patent applications WO 02/092183 and WO 02/092122.

Figure 2:
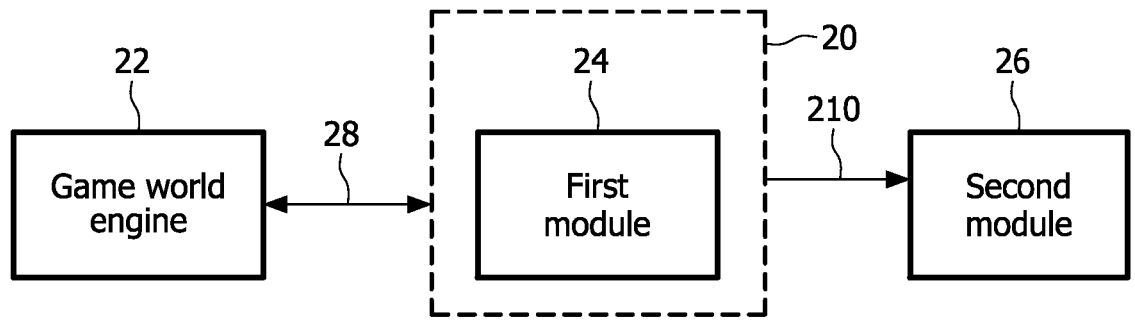
FIG. 2 shows a functional diagram of the embodiment of FIG. 1.

FIG. 2 shows three functional blocks (game world engine 22, first module 26, and second module 28) that are executed on computer 10. The game world engine 22 is associated with a protected computing environment 20, and the first module 24 is being executed within the protected computing environment. The game world engine 22 provides an Application Programming Interface (API) 28 that interfaces to the protected computing environment 20, and which the first module 24 can use to access the game world engine 22.

A second module 26 is being executed outside of the protected computing environment, and inter-module communication between the first module 24 and the second module 26 is enabled via a communication channel 210.

Figure 3:
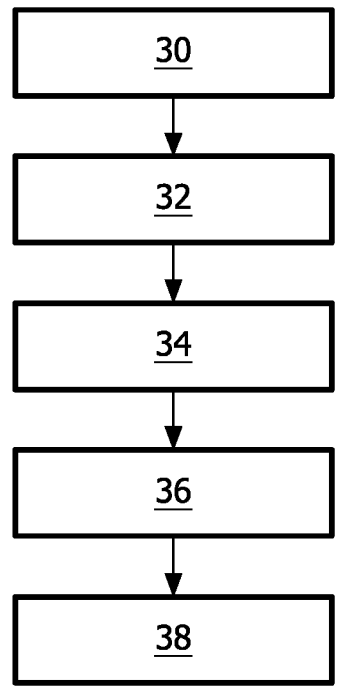
FIG. 3 shows a flow diagram of the embodiment of FIG. 1.

FIG. 3 shows a flow diagram with steps 30, 32, 34, 36, and 38. At step 30, the game world engine 22 is executed on computer 10 to generate the computer game world model. The computer game world model defines a virtual game world, within which the user's game world character can move.

At step 32, the first module 24 accesses parameters of the game world model by communicating with the game world engine 22 via the API 28. The parameters are parameters that indicate the state of the game world, and which may be useful for operating a set of devices 12, 14, 16 to augment the user's experience of the game. For example, the first module 24 may access parameters indicating that a lightening flash is about to occur, that a game character is about to be shot, that the scenery surrounding the game player is dominated by green foliage or blue sky, or that an explosion is in progress, or any other factor reflecting the state of the game world. The first module 24 may access parameters that relate to parts of the game world that are not currently within user's field of view of the game world. For example, a monster creeping up behind the user's game world character may be reflected in the ambient environment by projecting a shadow onto the wall 18 in front of the user, similarly to as described in co-pending patent application EP 05113363.8 (Agent's reference PH002231).

At step 34, these parameters are sent from the first module 24 to the second module 26, via the communication channel 210. The first module 24 may perform some processing on the accessed parameters before sending them to the second module 26, for example so the parameters are received by the second module 26 in a format that the second module understands.

Then, at step 36, the second module 26 analyses the parameters received from the first module 24, determines how the parameters should be reflected in the user's real-world ambient environment, and generates a real world description.

At step 38 the real world description is provided to a set of devices 12, 14, 16, such as lights, rumble packs, fans, or speakers. The real world description is used by the set of devices to render real world effects that cause changes in the user's ambient environment, to reflect the state of the game world, and to augment the user's experience of the game.

In this embodiment, the association between the game world engine 22 and the protected computing environment 20 is due to the protected computing environment 20 being defined by the game world engine 22. In other embodiments, the association may simply be due to the API 28, or any other type of connection that is used for passing data between the game world engine 22 and the first module 24 within the protected computing environment.

In this embodiment, the communication channel 210 is provided using the TCP/IP protocol, although other protocols suitable for transferring game world model parameters between the first and second modules could also be used.

In this embodiment, the API 28 provides an interpreter function, which the computer game world engine 22 uses to interpret the program code of the first module 24. Hence, in this embodiment, the execution (running) of the first module 24 within the protected computing environment 20 is constituted by the interpretation (or parsing) of the first module's program code by the game world engine's interpreter function, as will be apparent to those skilled in the art. In other embodiments, the first module 24 may be executed directly on the processor, instead of via an interpreter function.

The real world description generated by the second module 26 may be in the form of an instruction set of a markup language, or it may be in the form of commands specifying how aspects of the user's ambient environment should be set.

Figure 4:
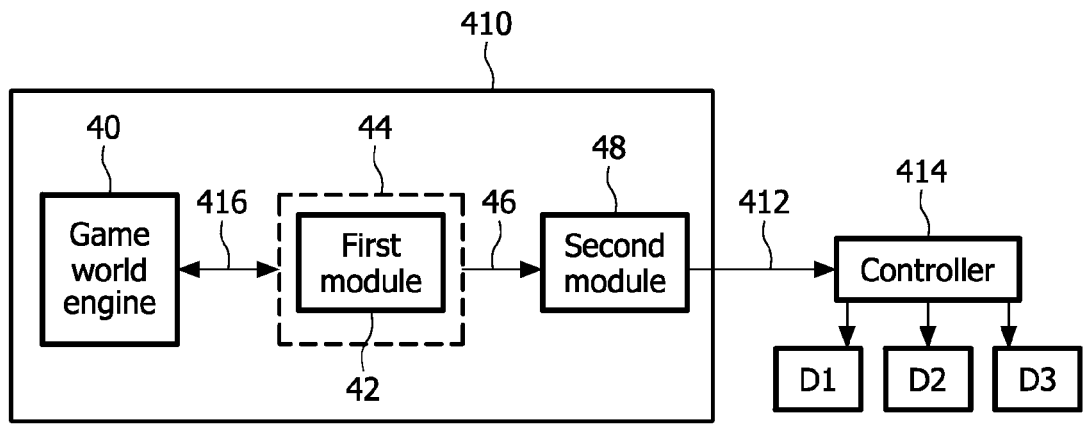
FIG. 4 shows a schematic diagram of an embodiment comprising a controller device.

FIG. 4 shows a schematic diagram of an embodiment that comprises a controller device 414 for interpreting the real world description. The game world engine 40 links to the first module 42 via the game world engine's API 416. The first module 42 is run (for example interpreted by the game world engine) within the game world engine's associated protected computing environment 44. The first module 42 accesses parameters of the game world model, and sends the parameters to the second module 48, via the communication channel 46. The second module 48 is outside of the protected computing environment 44, and so has access to greater computing power than the first module, and also has access to external devices, such as real world devices D1, D2, D3 for rendering the real-world experience. The second module 48 generates the real world description and sends it to a controller 414, which interprets the description and operates the real world rendering devices D1, D2, and D3 accordingly. The controller 414 may be integrated within D1, D2, or D3, or may be physically separate from D1, D2, or D3.

In this embodiment, the computing device 410 is a personal computer (PC), the link 412 from the second module 48 to the controller 414 is a cable, and controller 414 is implemented in a control box that transmits wireless signals for controlling devices D1, D2, and D3.

Figure 5:
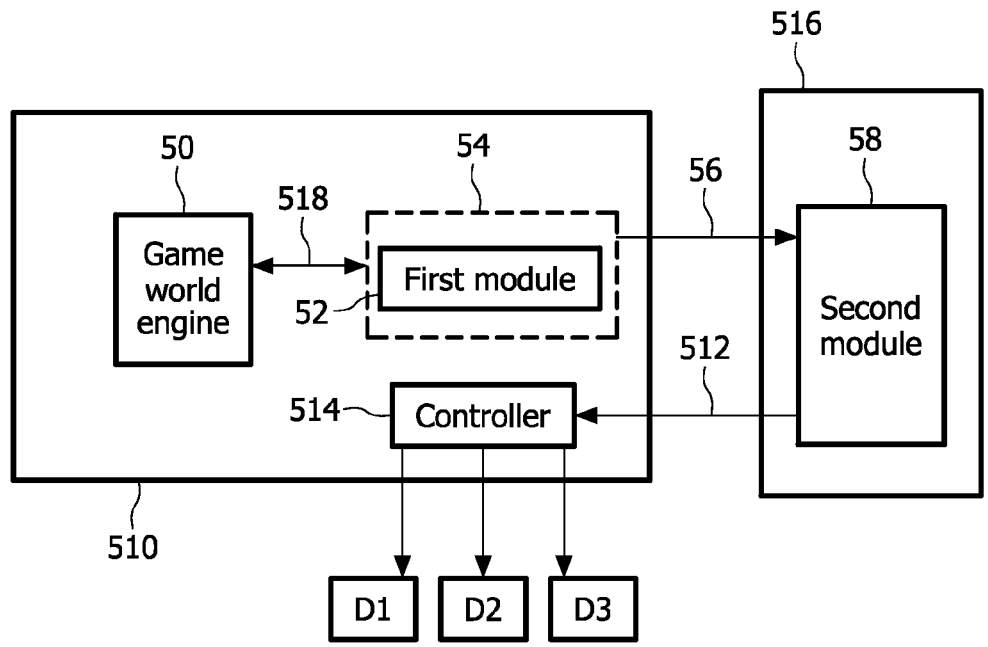
FIG. 5 shows a schematic diagram of an embodiment implemented on two computing devices that are connected together by a network.

FIG. 5 shows a schematic diagram of an embodiment where the second module 58 is implemented on a server device 516. The game world engine 50 connects to the first module 52 via the game world engine's API 516, the first module 52 being run within a protected computing environment 54 on a client device 510. Parameters of the game world model are sent via the communication channel 56 to the second module 58, the second module 58 being executed on a server device 516. The second module 58 generates the real world description and sends it to a controller 514 via a link 512, the controller 514 being implemented on the client 510. The controller 514 interprets the real world description and operates the devices D1, D2, and D3 accordingly.

In this embodiment, the client 510 is a PC, and the server 516 is a server that is accessible to the client 510 via the Internet. This arrangement is advantageous since the server 516 has greater computing power available for generating the real world description than the client 510 has available. In this embodiment, the communication channel 56 and link 512 are implemented as TCP/IP links over the internet. The controller 514 is embedded within the client device and the devices D1, D2, D3 for rendering the real world experience are connected to the controller 514 via cables.

Figure 6:
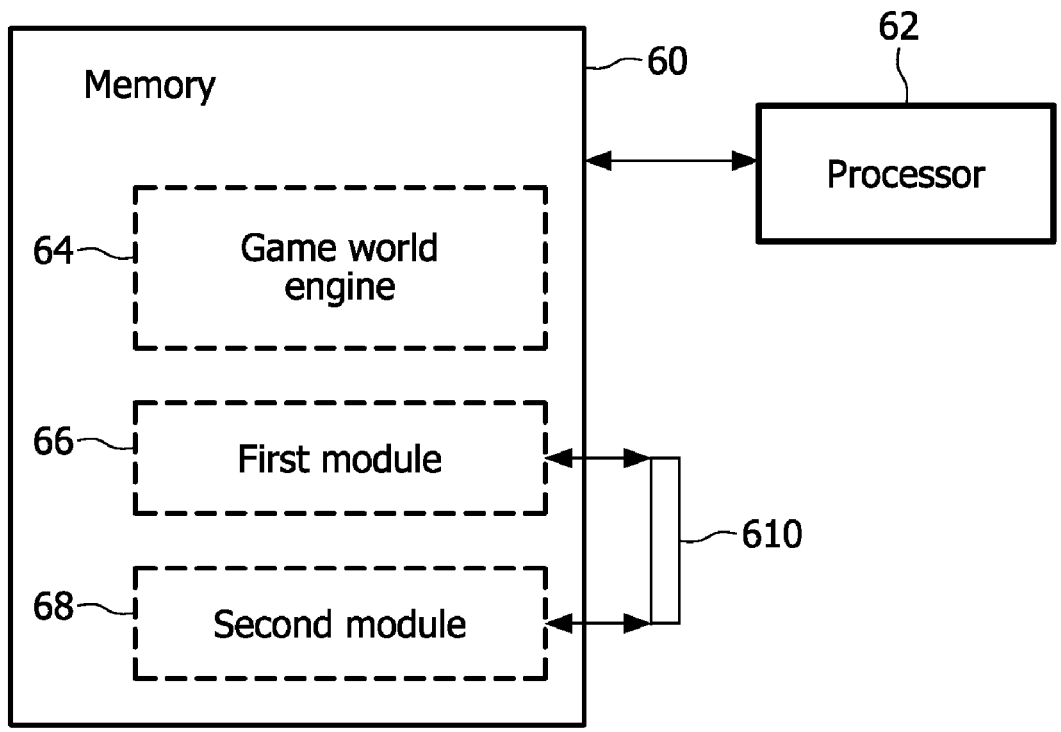
FIG. 6 shows a schematic diagram of an apparatus for implementing an embodiment of the invention.

FIG. 6 shows a diagram of a memory, a processor, and a communication channel configured to generate a real world description according to an embodiment of the invention.

The memory 60 stores the game world engine 64, the first module 66, and the second module 68. The memory 60 may be formed by a single physical or logical memory, or it may be stored by multiple physical or logical memories.

The processor 62 executes the game world engine 64, the first module 66, and the second module 68. In this embodiment, the first module 66 is executed on the processor 62 directly, although in other embodiments the first module 66 may be executed by an interpreter function of the game world engine. The processor 62 may comprise multiple processing units, such as a single physical processor with multiple processing cores, or such as multiple physical processors that are distributed in a network.

The processor 62 may comprise memory for storing the game world and the generated real world description, or in other embodiments a further memory separate from the processor may be provided for storing the game world and the generated real world description.

The communication channel 610 carries data between the first and second modules, for example data representing game world model parameters.

In this embodiment, the first and second modules take the form of software programs that are loaded into a memory 60 and then executed by a processor 62, although in other embodiments the first and/or second modules may be in the form of hardware, software, or any combination thereof.

Figure 7:
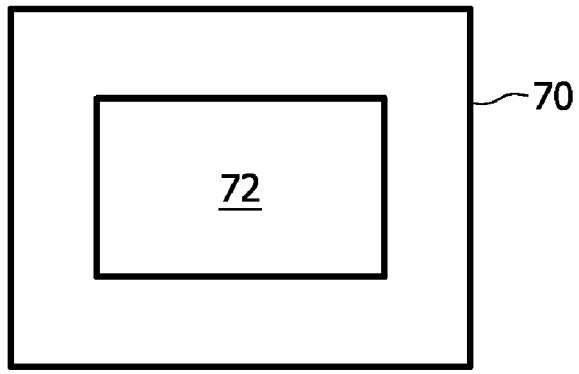
FIG. 7 shows a schematic diagram of a computer readable storage medium, the storage medium storing a computer program for implementing an embodiment of the invention.

FIG. 7 shows a schematic diagram of a computer readable storage medium, storing a computer program comprising program instructions which, when executed by a processor, cause the processor to carry out a method according to an embodiment of the invention. The computer readable storage medium 70 may be for example be in the form of a CD for distribution to computer game users, or for example be in the form of a memory temporarily storing the computer program. Such a memory is for example a Random Access Memory in a PC, following the download of the computer program over a network, such as the Internet. The computer program 72 may be written in any one or more computing languages suitable for controlling a memory and processor to generate the real world description language according to an embodiment of the invention.

In summary, there is disclosed a method, apparatus, computer program, and computer readable storage medium storing the computer program, for generating a real-world description to operate a set of devices (12, 14, 16) to augment a user's experience of a game world. The game world is defined by a game world model, and parameters of the game world model are accessed by a first module being run within a protected computing environment. These parameters are sent to a second module running outside of the protected computing environment, and the second module uses these parameters to generate the real world description for controlling the set of devices.

Other embodiments falling within the scope of the appended claims will also be apparent to those skilled in the art. For example, there are many ways in which the various components of the invention discussed herein may be partitioned between physical/logical devices and/or connected to one another. Reference signs in the claims are not to be construed so as to limit the scope of the claims.

The invention claimed is:

1. A method for generating a real world description to operate a set of devices to augment a user's experience of a computer game world, the method comprising:
   a) executing a game world engine to generate a computer game world model, the game world engine being associated with a protected computing environment;
   b) accessing parameters of the game world model, using a first module being executed within the protected computing environment;
   c) sending the parameters, via a communication channel, to a second module being executed outside of the protected computing environment; and
   d) generating, in the second module and according to the parameters, the real world description.

2. A method according to claim 1, further comprising:
   e) providing the real world description to the set of one or more devices;
   f) rendering the real world description on the set of one or more devices to augment the users experience of the game world.

3. A method according to claim 2, wherein the real world description is provided to a controller device of the set of devices, and wherein the controller device interprets the real world description and generates signals to control the set of devices to augment the users experience of the game world.

4. A method according to claim 1, wherein step d) comprises generating the real world description in the form of an instruction set of a markup language.

5. A method according to claim 1, wherein step c) comprises sending the parameters over the communication channel using the TCP/IP protocol.

6. A method according to claim 1, wherein step b) further comprises processing the accessed parameters before sending via the communication channel.

7. Apparatus configured to generate a real world description to operate a set of devices to augment a user's experience of a computer game world, the apparatus comprising:
   a) a memory adapted to store:
      a game world engine;
      a first module;
      a second module;
   b) a communication channel for enabling inter-module communication between the first and second modules; and
   c) a processor adapted to:
      execute the game world engine to generate a computer game world model, the game world engine being associated with a protected computing environment;
      execute the first module within the protected computing environment, to access parameters of the game world model;
      send the parameters, via the communication channel, to the second module;
      execute the second module outside of the protected computing environment, to generate the real world description according to the parameters.

8. A computer program product for use with a computer system for generating a real world description to operate a set of devices to augment a user's experience of a computer game world, the computer program product comprising a computer readable medium having program code embodied thereon, the program code comprising:
   a) program code for executing a game world engine to generate a computer game world model, the game world engine being associated with a protected computing environment;
   b) program code for accessing parameters of the game world model, using a first module being executed within the protected computing environment;
   c) program code for sending the parameters, via a communication channel, to a second module being executed outside of the protected computing environment; and
   d) program code for generating, in the second module and according to the parameters, the real world description.

9. The computer program product according to claim 8, further comprising:
   e) program code for providing the real world description to the set of one or more devices;
   f) program code for rendering the real world description on the set of one or more devices to augment the users experience of the game world.

10. The computer program product according to claim 8, wherein the real world description is provided to a controller device of the set of devices, and wherein the controller device interprets the real world description and generates signals to control the set of devices to augment the user's experience of the game world.

11. The computer program product according to claim 8, wherein d) comprises program code for generating the real world description in the form of an instruction set of a markup language.

12. The computer program product according to claim 8, wherein c) comprises program code for sending the parameters over the communication channel using the TCP/IP protocol.

13. The computer program product according to claim 8, wherein
   b) further comprises program code for processing the accessed parameters before sending via the communication channel.

* * * * *